(12) United States Patent
Chen et al.

(10) Patent No.: US 7,562,371 B2
(45) Date of Patent: Jul. 14, 2009

(54) OPTICAL DISC DRIVE

(75) Inventors: Jung-Fu Chen, Hsinchu (TW);
Min-Cheng Yang, Hsinchu (TW)

(73) Assignee: Lite-On It Corporation, Hsinchu (TW)

( * ) Notice: Subject to any disclaimer, the term of this patent is extended or adjusted under 35 U.S.C. 154(b) by 463 days.

(21) Appl. No.: 11/462,370

(22) Filed: Aug. 4, 2006

(65) Prior Publication Data
US 2007/0107005 A1    May 10, 2007

(30) Foreign Application Priority Data
Nov. 4, 2005    (TW)    .............................. 94138727 A

(51) Int. Cl.
*G11B 17/03* (2006.01)
(52) U.S. Cl. ..................................................... 720/603
(58) Field of Classification Search ................. 720/603, 720/649, 652, 613, 616, 606, 604, 601, 607, 720/671
See application file for complete search history.

(56) References Cited

U.S. PATENT DOCUMENTS

| | | | |
|---|---|---|---|
| 6,370,101 B1 * | 4/2002 | Kim ........................... | 720/603 |
| 7,219,361 B2 * | 5/2007 | Cho et al. .................. | 720/718 |
| 2004/0133900 A1 * | 7/2004 | Cho et al. .................. | 720/603 |
| 2007/0124742 A1 * | 5/2007 | Makino ....................... | 720/603 |
| 2007/0214464 A1 * | 9/2007 | Nakada et al. .............. | 720/651 |

* cited by examiner

*Primary Examiner*—Allen T Cao
(74) *Attorney, Agent, or Firm*—Jianq Chyun IP Office

(57) ABSTRACT

An optical disc drive including a case, a tray, a turntable, a pickup head, a transmission mechanism, and a protecting cover is provided. The tray is movably set inside the case. The turntable is embedded in the tray. The pickup head is movably embedded in the tray. The transmission mechanism is embedded in the tray and connected to the pickup head. And the protecting cover is set on the tray and covers the transmission mechanism. The protecting cover has a protruding structure located on the surface of the protecting cover that corresponds to a non-data area of an optical disc. Moreover, the tray has a protruding structure located on the surface of the tray adjacent to the protecting cover. Furthermore, pads could be substituted for the abovementioned protruding structures.

16 Claims, 7 Drawing Sheets

OPTICAL DISC DRIVE

CROSS-REFERENCE TO RELATED APPLICATION

This application claims the priority benefit of Taiwan application serial no. 94138727, filed on Nov. 4, 2005. All disclosure of the Taiwan application is incorporated herein by reference.

BACKGROUND OF THE INVENTION

1. Field of Invention

The present invention relates to an optical disc drive. More particularly, the present invention relates to an optical disc drive having a structure for preventing an optical disc from being scraped.

2. Description of Related Art

Optical disc has the advantages of low price, easy to carry, large storage capacity, long storage term and so on, so the optical disc has gradually replaced the conventional magnetic storage medium and becomes an indispensable optical storage medium in modern life. Due to the widespread use of the optical disc, the optical disc drive for reading the data in the optical disc has also become a common electronic product in daily life.

FIG. 1 depicts a schematic view of a conventional optical disc drive. Referring to FIG. 1, the conventional optical disc drive 100 mainly includes a case 110, a tray 120, a turntable 130, a pickup head 140, a transmission mechanism (not shown), and a protecting cover 160. The tray 120 is movably set inside the case 110 to load an optical disc 50 in or out of the case 110. The turntable 130, the pickup head 140 and the transmission mechanism are all embedded in the tray 120, and the protecting cover 160 is set on the tray 120 and covers the transmission mechanism which is not shown in FIG. 1. When the optical disc drive 100 reads the data on the optical disc 50, the optical disc 50 is held on the turntable 130 and rotates with the turntable 130, while the transmission mechanism drives the pickup head 140 to move along the radial direction of the optical disc 50 and read the data on the optical disc 50.

However, when the optical disc 50 rotates with the turntable 130, if the optical disc drive 100 shakes under the impact of an external force, the optical disc 50 is easily shaken up and down and scraped by the contact with the tray 120 or the protecting cover 160. Moreover, when the user takes the optical disc 50 out from the turntable 130, because of improperly applied force, the optical disc 50 may come out askew and is in contact with the tray 120 or the protecting cover 160, which also may cause the optical disc 50 to be scraped. Once a scratch is generated on the data area 52 of the optical disc 50, the optical disc drive 100 is unable to read out the data stored on the optical disc 50.

To solve the above problem, the conventional optical disc drive 100 forins a concentric circle rib 122 with the turntable 130 as its center on the surface of the tray 120. The position of the concentric circle rib 122 corresponds to the non-data area 54 at the outer edge of the optical disc 50. Therefore, even if the optical disc drive 100 shakes under impact of the external force, only the non-data area 54 of the optical disc 50 is in contact with the concentric circle rib 122, thereby reducing the probability of the data area 52 of the optical disc 50 being scraped. However, the conventional optical disc drive 100 has no rib on the protecting cover 160, so when the optical disc 50 is in contact with the protecting cover 160, the data area 52 of the optical disc 50 still may be scraped by the protecting cover 160. Meanwhile, employing the concentric circle rib 122 also cannot solve the problem of the optical disc 50 being scraped when being taking out the optical disc 50 by the user.

As the data stored in the optical disc is generally very important to the user, how to solve the above-mentioned problem and prevent the optical disc from being scraped by the optical disc drive has become an urgent subject.

SUMMARY OF THE INVENTION

Accordingly, an object of the present invention is to provide an optical disc drive suitable for preventing the optical disc from being scraped.

The present invention provides an optical disc drive including a case, a tray, a turntable, a pickup head, a transmission mechanism, and a protecting cover. The tray is movably set inside the case. The turntable is embedded in the tray. The pickup head is movably embedded in the tray. The transmission mechanism is embedded in the tray and connected to the pickup head. And the protecting cover is set on the tray and covers the transmission mechanism. The turntable is used to hold and rotate an optical disc. The pickup head is used to read the data on the optical disc. And the transmission mechanism is used to drive the pickup head to move. The protecting cover has a protruding structure located on the surface of the protecting cover corresponding to a non-data area at the outer edge of the optical disc.

The present invention provides another optical disc drive including a case, a tray, a turntable, a pickup head, a transmission mechanism, and a protecting cover. The tray is movably set inside the case. The turntable is embedded in the tray. The pickup head is movable embedded in the tray. The transmission mechanism is embedded in the tray and connected to the pickup head. And the protecting cover is set on the tray and covers the transmission mechanism. The turntable is used to hold and rotate an optical disc. The pickup head is used to read the data on the optical disc. And the transmission mechanism is used to drive the pickup head to move. The tray has a protruding structure located on the surface of the tray adjacent to the protecting cover.

In the above two optical disc drives, the protruding structure is, for example, distributed in dot or stripe form. Alternatively, the protruding structure can be, for example, multiple round protruding dots or multiple striped protruding dots.

The present invention further provides an optical disc drive including a case, a tray, a turntable, a pickup head, a transmission mechanism, a protecting cover, and at least one pad. The tray is movably set inside the case. The turntable is embedded in the tray. The pickup head is movably embedded in the tray. The transmission mechanism is embedded in the tray and connected to the pickup head. And the protecting cover is set on the tray and covers the transmission mechanism. The turntable is used to hold and rotate an optical disc. The pickup head is used to read the data on the optical disc. And the transmission mechanism is used to drive the pickup head to move. The pad is disposed on the surface of the protecting cover corresponding to a non-data area at the outer edge of the optical disc.

The present invention further provides an optical disc drive including a case, a tray, a turntable, a pickup head, a transmission mechanism, a protecting cover, and at least one pad. The tray is movably set inside the case. The turntable is embedded in the tray. The pickup head is movably embedded in the tray. The transmission mechanism is embedded in the tray and connected to the pickup head. And the protecting cover is set on the tray and covers the transmission mechanism. The turntable is used to hold and rotate an optical disc. The pickup head is used to read the data on the optical disc. And the transmission mechanism is used to drive the pickup head to move. The pad is disposed on the surface of the tray adjacent to the protecting cover.

In the above two optical disc drives, the pad can be dot-shaped or stripe-shaped. Furthermore, the pad can be, for example, an anti-wear pad.

Moreover, in the aforementioned four optical disc drives, for example, a control circuit board disposed inside the case and a flexible cable connecting the pickup head, the turntable, the transmission mechanism, and the control circuit board are further included.

In view of the above, the optical disc drive of the invention has a protruding structure located on the surface of the protecting cover corresponding to the non-data area of the optical disc, or has a protruding structure on the surface of the tray adjacent to the protecting cover. Meanwhile, the protruding structure can be replaced by a pad. Therefore, the optical disc can be prevented from being scraped by the optical disc drive.

In order to the make the aforementioned and other objects, features and advantages of the present invention more comprehensible, preferred embodiments accompanied with figures are described in detail below.

DESCRIPTION OF EMBODIMENTS

Figure 1:
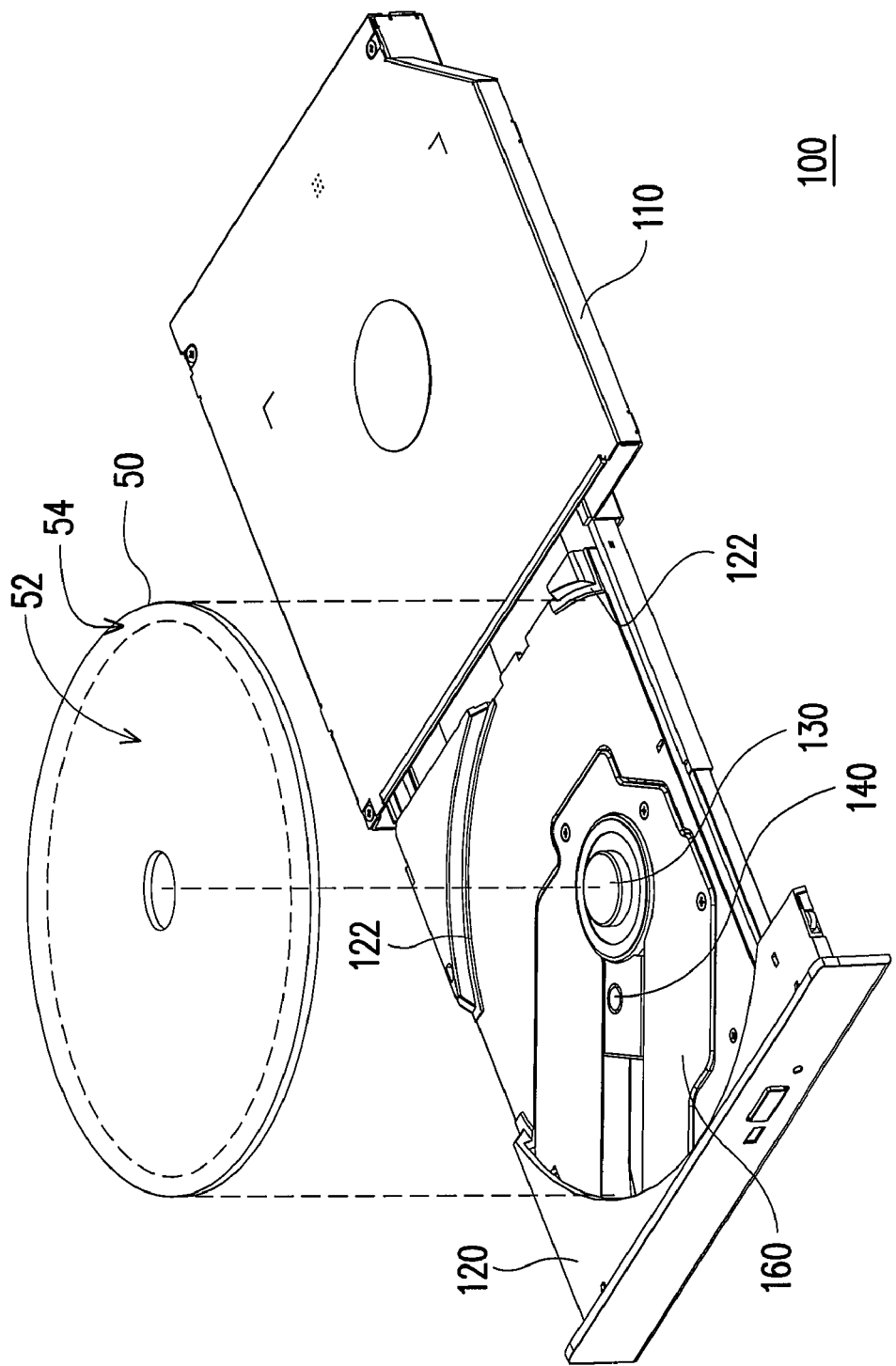
FIG. 1 depicts a schematic view of a conventional optical disc drive.
Figure 2A:
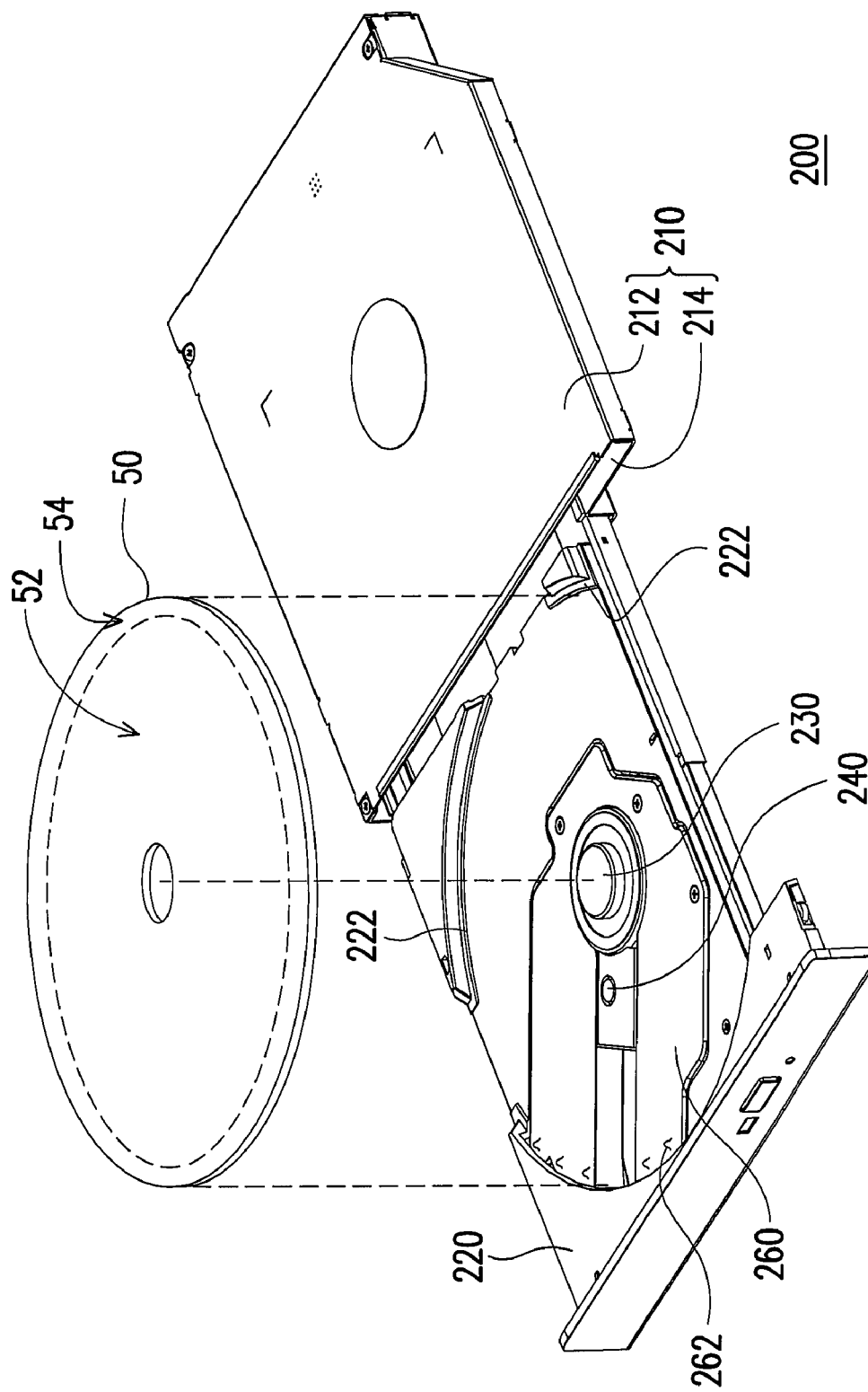
FIG. 2A depicts a schematic view of an optical disc drive according to an embodiment of the invention.
Figure 2B:
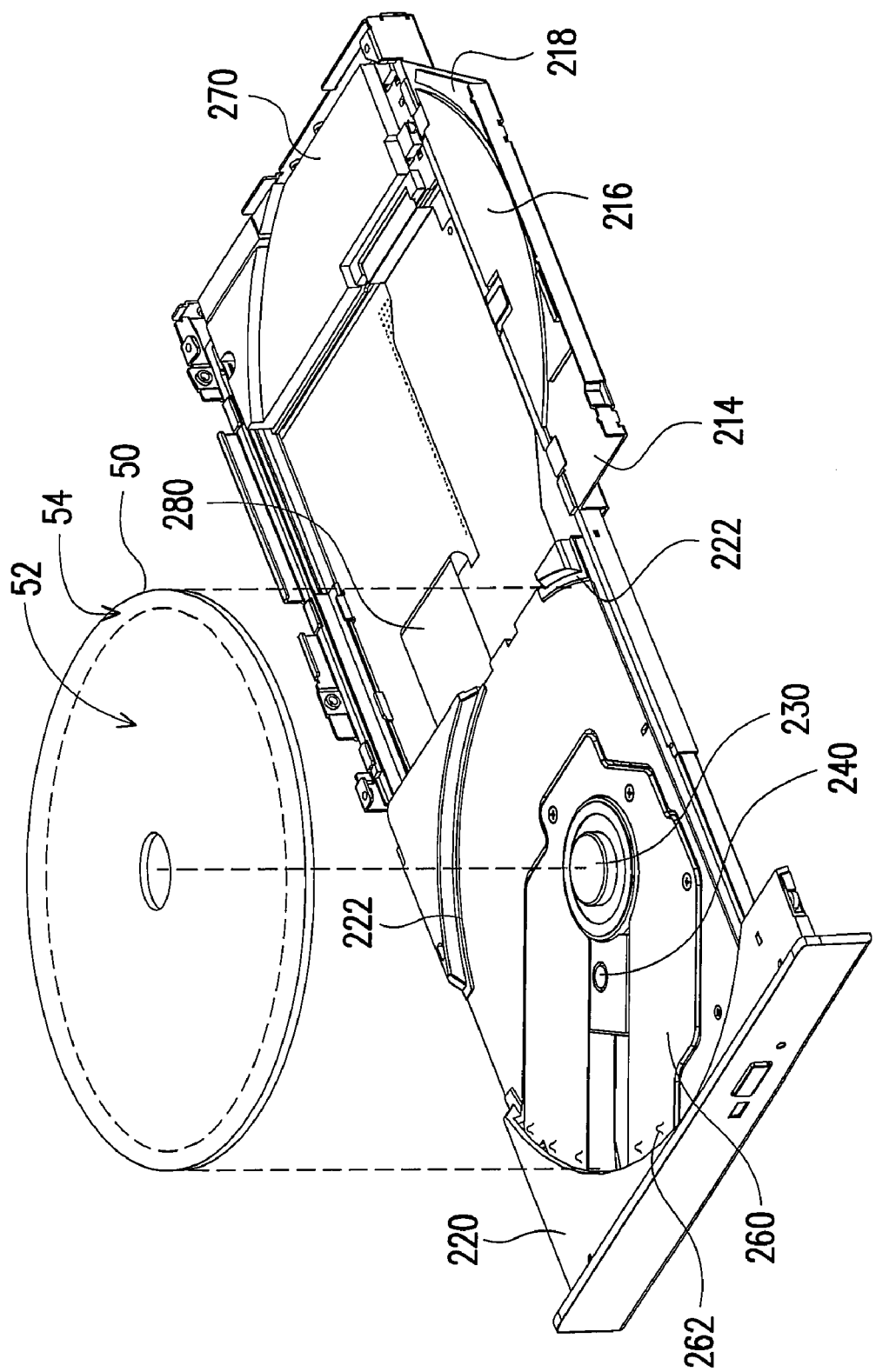
FIG. 2B depicts a schematic view of the optical disc drive in FIG. 2A after the upper case is removed.

FIG. 2A depicts a schematic view of an optical disc drive according to an embodiment of the invention, and FIG. 2B depicts a schematic view of the optical disc drive in FIG. 2A after the upper case is removed. Referring to FIGS. 2A and 2B, the optical disc drive 200 of the invention includes a case 210, a tray 220, a turntable 230, a pickup head 240, a transmission mechanism (not shown), and a protecting cover 260. The case 210, for example, including an upper case 212 and a lower case 214 is often made of metal. The tray 220 is movably set inside the case 210 to load an optical disc 50 in and out of the case 210. The turntable 230, the pickup head 240, and the transmission mechanism are all embedded in the tray 220, and the protecting cover 260 is set on the tray 220 and covers the transmission mechanism, so the transmission mechanism is not shown in FIGS. 2A and 2B. When the optical disc drive 200 reads the data on the optical disc 50, the optical disc 50 is held on the turntable 230 and rotates with the turntable 230, and the transmission mechanism drives the pickup head 240 to move radially along the optical disc 50 and read the data stored on the optical disc 50.

The optical disc 50 has a data area 52 and a non-data area 54 surrounding the data area 52, i.e., the outer edge of the optical disc 50 is the non-data area 54. The characteristic of this embodiment is that the protecting cover 260 has a protruding structure 262 on its surface corresponding to the non-data area 54 at the outer edge of the optical disc 50. As the protruding structure 262 is higher than other parts of the protecting cover 260, even if the optical disc drive 200 shakes under the impact of an external force, only the non-data area 54 of the optical disc 50 will be in contact with the protruding structure 262, thus solving the conventional problem of the data area 52 of the optical disc 50 being scraped by the protecting cover 260. In general, the protecting cover 260 is made of metal, so the protruding structure 262 can be formed by punching the protecting cover 260. Of course, the material of the protecting cover 260 can be plastic or another suitable material, and the protruding structure 262 is in the same way integrally formed on the protecting cover 260 corresponding to the non-data area 54.

Furthermore, a concentric circle rib 222 with the turntable 230 as the center can also be formed conventionally on the surface of the tray 220 corresponding to the non-data area 54. Referring to FIG. 2B, a spongy pad 216 and an anti-wear pad 218 are further disposed on the lower case 214. All of the concentric circle rib 222, the spongy pad 216, and the anti-wear pad 218 can protect the optical disc 50 from being scraped.

Moreover, the optical disc drive 200 can further include a control circuit board 270 and a flexible flat cable 280. The control circuit board 270 is, for example, disposed on the lower case 214, and the flexible flat cable 280 connects the pickup head 240, the turntable 230, the transmission mechanism, and the control circuit board 270. When the pickup head 240 reads the data on the optical disc 50, the control circuit board 270 controls the movement of the turntable 230, the transmission mechanism, and the pickup head 240, and transmits the data signal read by the pickup head 240 via the flexible flat cable 280.

Figure 3C:
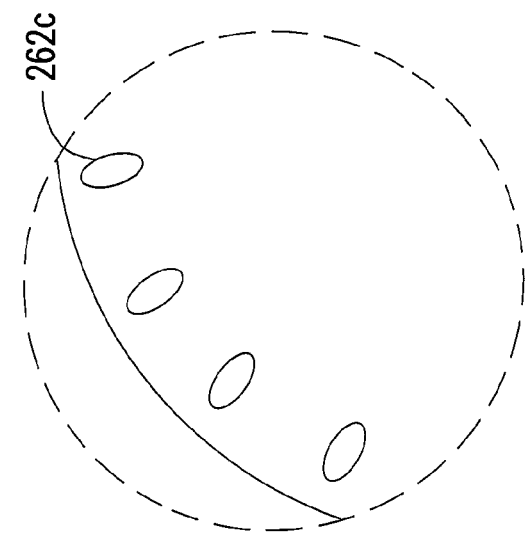
FIGS. 3A-3C depict top views of three protruding structures.
Figure 3B:
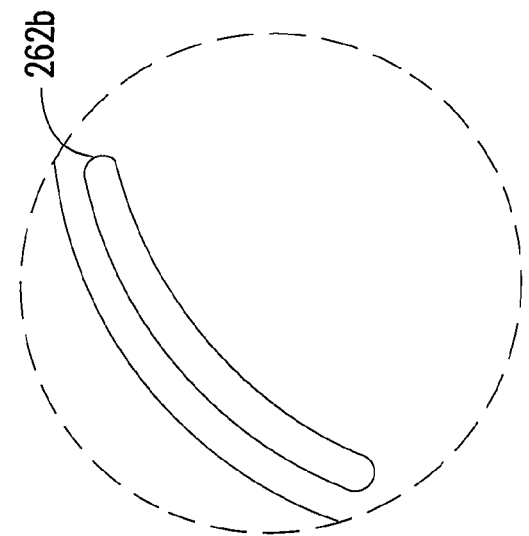
Figure 3A:
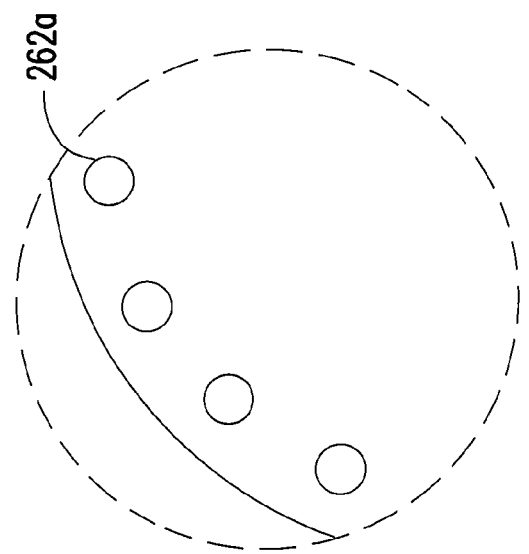

FIGS. 3A-3C depict top views of three protruding structures. Referring to FIGS. 3A-3C, the protruding structure on the surface of the protecting cover 260 in the invention can be distributed in dot form (such as the protruding structure 262*a* in FIG. 3A) or in stripe form (such as the protruding structure 262*b* in FIG. 3B). The protruding structure 262*b* in FIG. 3B, for example, takes the turntable as the center and is distributed as a concentric circle. Besides the round-dot protruding structure 262*a* in FIG. 3A, the protruding structure can also be stripe-shaped as the protruding structure 262*c* in FIG. 3C. Of course, the aforementioned distribution manners of the protruding structure are only examples for the purpose of illustrating, rather than limiting, the invention.

Figure 4:
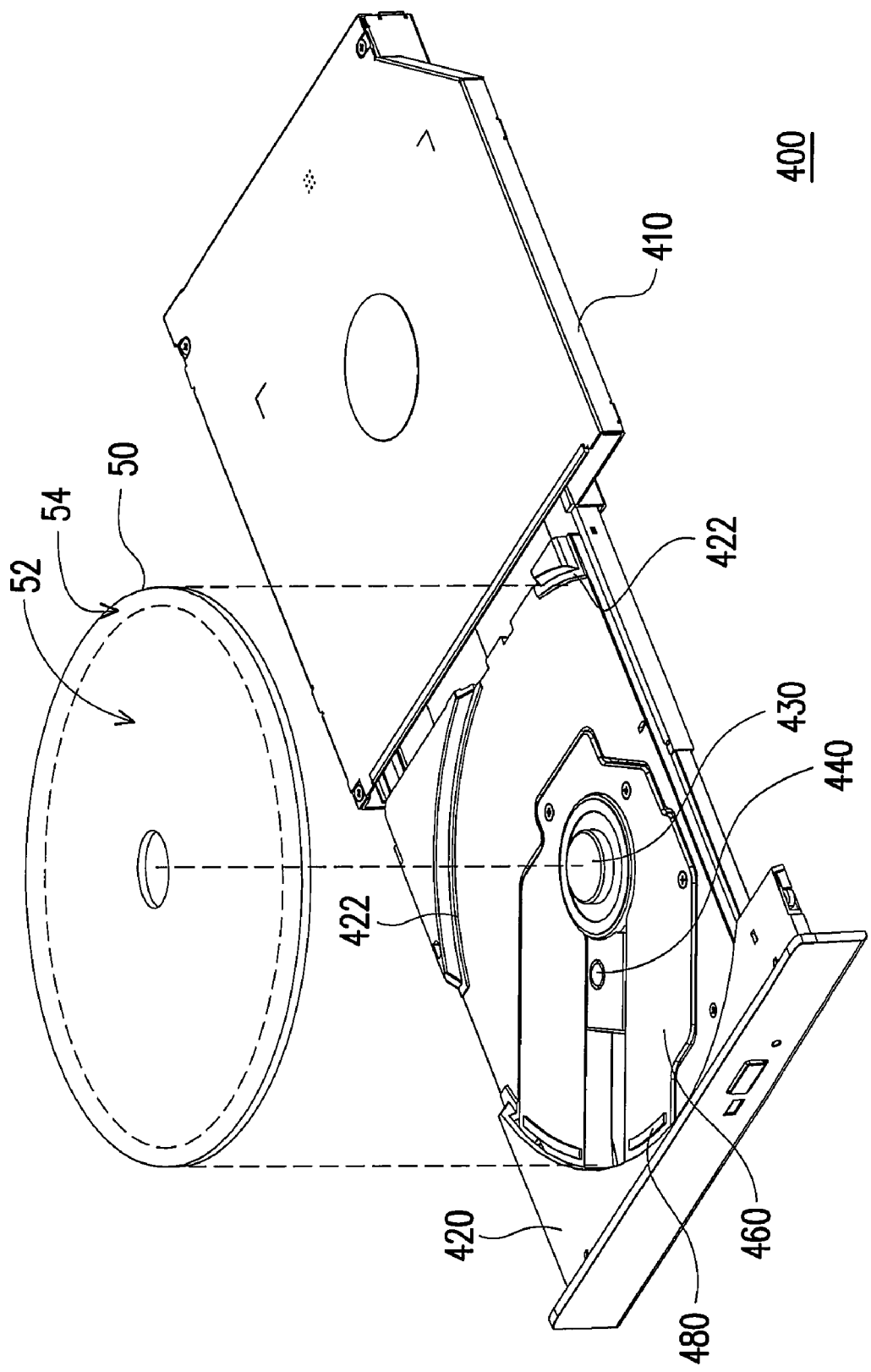
FIG. 4 depicts a schematic view of an optical disc drive according to another embodiment of the invention.

FIG. 4 depicts a schematic view of an optical disc drive according to another embodiment of the invention. Referring to FIG. 4, the optical disc drive 400 of the embodiment is similar to the optical disc drive 200 in FIG. 2A, except that the optical disc drive 400 further includes at least one pad 480. Other similar means are given the similar reference numerals as shown in FIG. 2A, and the detailed description is omitted herein. In the optical disc drive 400, the pad 480 is disposed on the surface of the protecting cover 460 corresponding to the non-data area 54 at the outer edge of the optical disc 50. In other words, in the embodiment the pad 480 is used to replace the protruding structure 262 in FIG. 2A. Therefore, the data area 52 of the optical disc 50 is protected from being scraped when the optical disc drive 400 shakes under the impact of the external force. Of course, the distribution manner and shape of the pad 480 are also similar to the protruding structure in FIGS. 3A-3C. Furthermore, the pad 480 can also be an anti-wear pad to avoid wear after long term use, and protect the non-data area 54 of the optical disc 50 from being scraped by the pad 480.

Figure 5:
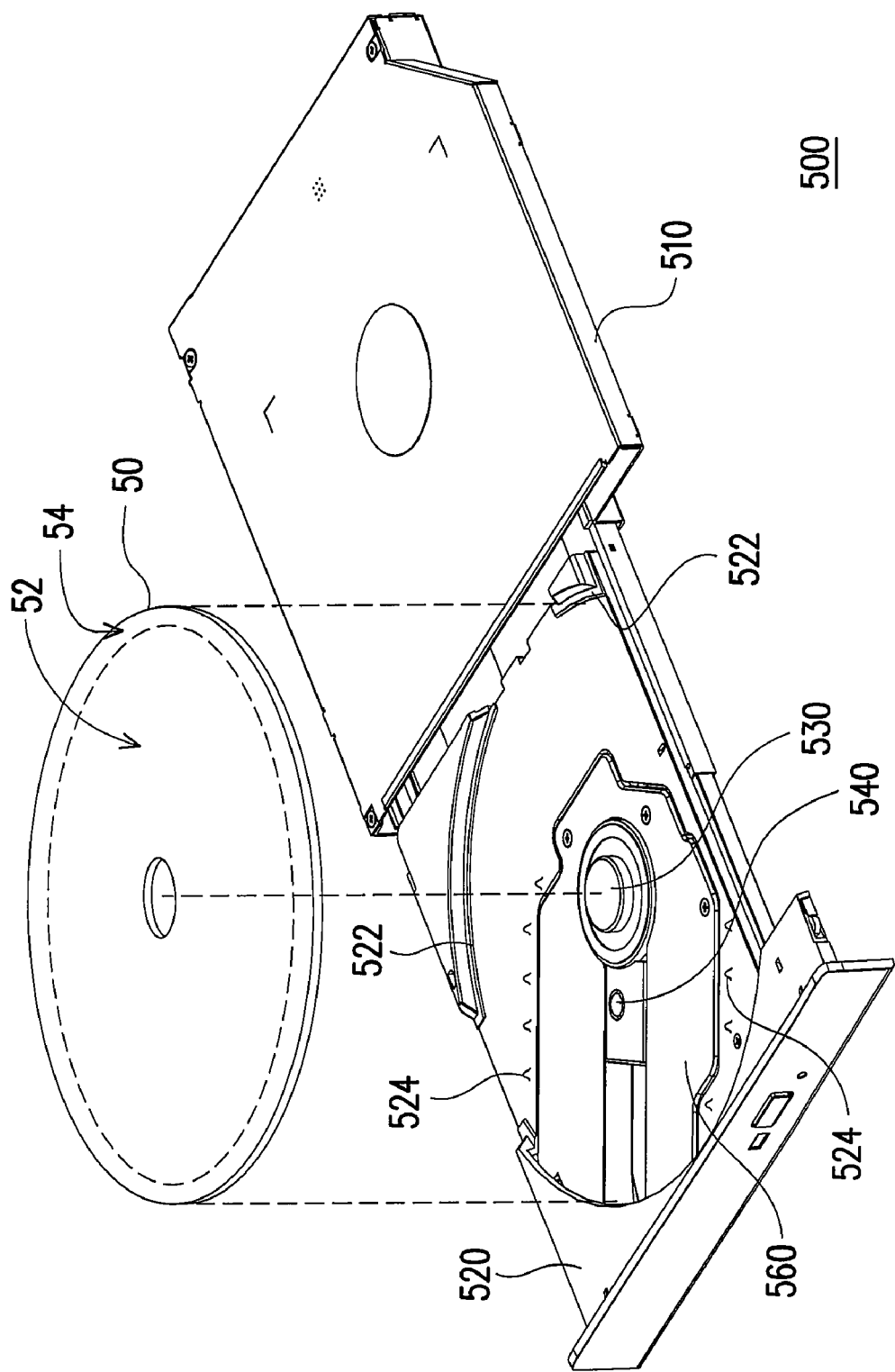
FIG. 5 depicts a schematic view of an optical disc drive according to still another embodiment of the invention.

FIG. 5 depicts a schematic view of an optical disc drive according to another embodiment of the invention. Referring to FIG. 5, the optical disc drive 500 of the embodiment is similar to the optical disc drive 200 in FIG. 2A, except that the tray 520 of the optical disc drive 500 has a protruding structure 524 located on the surface of the tray 520 adjacent to the protecting cover 560. Other identical means are given the similar reference numerals as in FIG. 2A, and the detailed description is omitted here. As the protruding structure 524 is higher than the surface of the protecting cover 560 and adjacent to the protecting cover 560, the optical disc 50 is protected from being scraped by the protecting cover 560 when being taken out by the user. The protruding structure 524 in the embodiment is, for example, integrally formed on the tray 520. Of course, the protruding structure 524 can be distributed in dot form or in stripe form, and can be, but is not limited to, a round protruding dot or a striped protruding dot.

Figure 6:
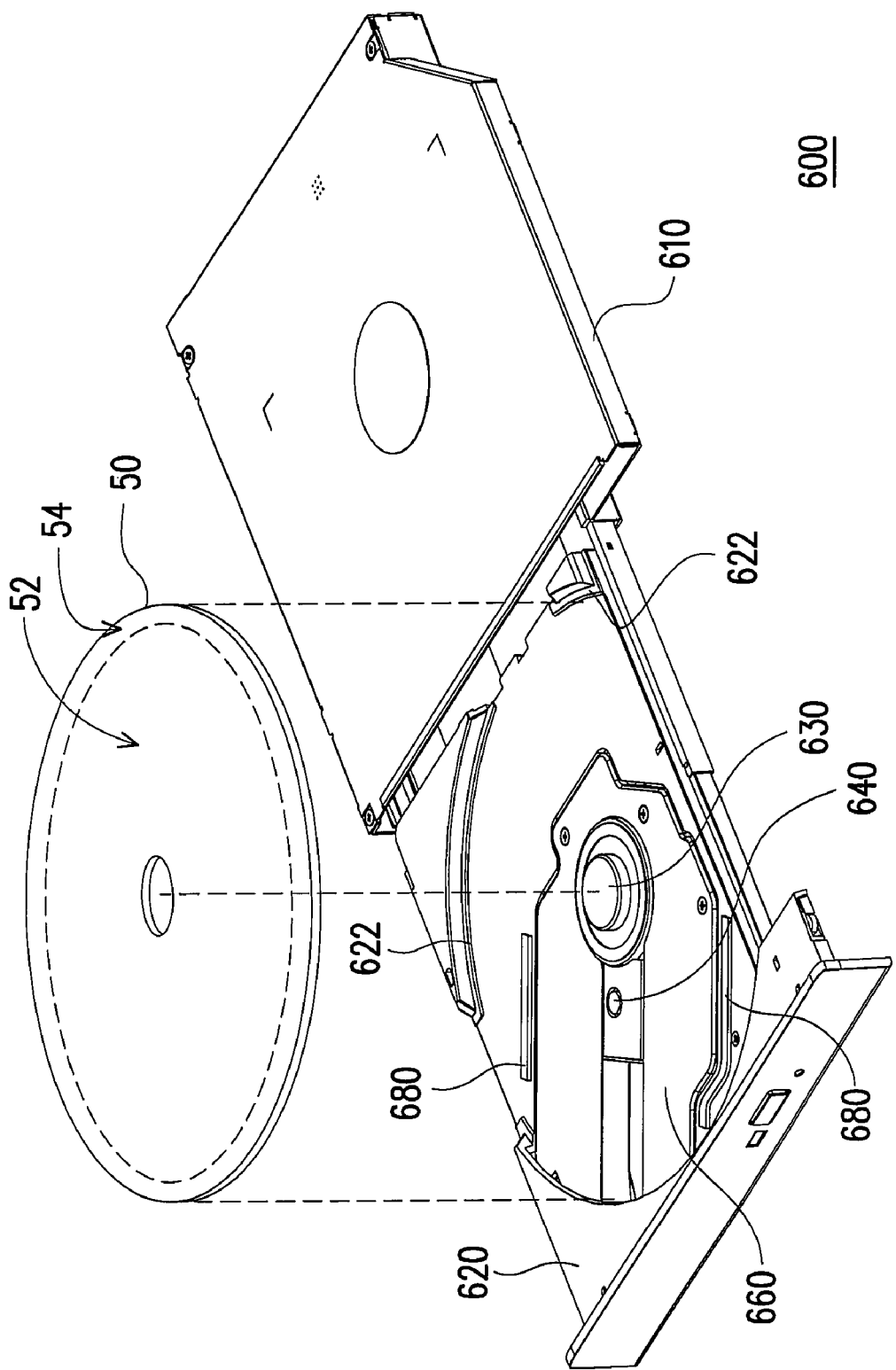
FIG. 6 depicts a schematic view of an optical disc drive according to yet another embodiment of the invention.

FIG. 6 depicts a schematic view of an optical disc drive according to another embodiment of the invention. Referring to FIG. 6, the optical disc drive 600 of the embodiment is similar to the optical disc drive 500 in FIG. 5, except that the optical disc drive 600 further includes at least one pad 680. Other identical means are given the similar reference numerals as in FIG. 5, and the description is omitted herein. In the optical disc drive 600, the pad 680 is disposed on the surface of the tray 620 adjacent to the protecting cover 660. In other words, in the embodiment, the pad 680 is used to replace the protruding structure 524 in FIG. 5. Therefore, the optical disc 50 can also be protected from being scraped by the protecting cover 660 when being taken out by the user. Of course, the distribution manner and shape of the pad 680 are also similar to the protruding structure 524 in FIG. 5. Furthermore, the pad 680 can be an anti-wear pad to thoroughly protect the optical disc 50 from being scraped by the pad 680.

In view of the above, in the optical disc drive of the invention, the protecting cover has a protruding structure located on the surface of the protecting cover corresponding to the non-data area of the optical disc; or the tray has a protruding structure located on the surface of the tray adjacent to the protecting cover; or both of the protecting cover and the tray have protruding structures. Meanwhile, the protruding structure can be substituted by a pad. Therefore, the data area of the optical disc can be protected from being scraped when the optical disc drive shakes under the impact of an external force. Moreover, the optical disc can be prevented from being scraped by the protecting cover when being taken out by the user. Thereby, the data stored in the optical disc can be more thoroughly protected for the user.

Though the present invention has been disclosed above by the preferred embodiments, these are not intended to limit the invention. Any skilled in the art can make some modifications and variations without departing from the spirit and scope of the invention. Therefore, the protection range of the invention shall be defined by the appended claims.

What is claimed is:

1. An optical disc drive, comprising:
a case;
a tray, movably disposed inside the case;
a turntable, embedded in the tray, for holding and rotating an optical disc;
a pickup head, movably embedded in the tray, for reading the data on the optical disc;
a transmission mechanism, embedded in the tray and connected to the pickup head, for moving the pickup head; and
a protecting cover, disposed on the tray and covering the transmission mechanism, wherein the outer edge of the optical disc has a non-data area, and the protecting cover has a protruding structure located on the surface of the protecting cover corresponding to the non-data area.

2. The optical disc drive according to claim 1, wherein the protruding structure is distributed in dot form or in stripe form.

3. The optical disc drive according to claim 1, wherein the protruding structure comprises multiple round protruding dots or multiple striped protruding dots.

4. The optical disc drive according to claim 1, further comprising:
a control circuit board, disposed inside the case; and
a flexible cable, connecting the pickup head, the turntable, the transmission mechanism, and the control circuit board.

5. An optical disc drive, comprising:
a case;
a tray, movably disposed inside the case;
a turntable, embedded in the tray, for holding and rotating an optical disc;
a pickup head, movably embedded in the tray, for reading the data on the optical disc;
a transmission mechanism, embedded in the tray and connected to the pickup head, for moving the pickup head;
a protecting cover, disposed on the tray and covering the transmission mechanism; and
at least one pad, wherein the outer edge of the optical disc has a non-data area, and the pad is disposed on the surface of the protecting cover corresponding to the non-data area.

6. The optical disc drive according to claim 5, wherein the pad is a dot-shaped or stripe-shaped pad.

7. The optical disc drive according to claim 5, wherein the pad comprises an anti-wear pad.

8. The optical disc drive according to claim 5, further comprising:
a control circuit board, disposed inside the case; and
a flexible cable, connecting the pickup head, the turntable, the transmission mechanism, and the control circuit board.

9. An optical disc drive, comprising:
a case;
a tray, movably disposed inside the case;
a turntable, embedded in the tray, for holding and rotating an optical disc;
a pickup head, movably embedded in the tray, for reading the data on the optical disc;
a transmission mechanism, embedded in the tray and connected to the pickup head, for moving the pickup head; and
a protecting cover, disposed on the tray and covering the transmission mechanism; wherein the tray has a protruding structure located on its surface adjacent to the protecting cover.

10. The optical disc drive according to claim 9, wherein the protruding structure is distributed in dot form or in stripe form.

11. The optical disc drive according to claim 9, wherein the protruding structure comprises multiple round protruding dots or multiple striped protruding dots.

12. The optical disc drive according to claim 9, further comprising:

a control circuit board, disposed inside the case; and a flexible cable, connecting the pickup head, the turntable, the transmission mechanism, and the control circuit board.

13. An optical disc drive, comprising:

a case;

a tray, movably disposed inside the case;

a turntable, embedded in the tray, for holding and rotating an optical disc;

a pickup head, movably embedded in the tray, for reading the data on the optical disc;

a transmission mechanism, embedded in the tray and connected to the pickup head, for moving the pickup head;

a protecting cover, disposed on the tray and covering the transmission mechanism; and at least one pad, disposed on the surface of the tray adjacent to the protecting cover.

14. The optical disc drive according to claim 13, wherein the pad is a dot-shaped or stripe-shaped pad.

15. The optical disc drive according to claim 13, wherein the pad comprises an anti-wear pad.

16. The optical disc drive according to claim 13, further comprising:

a control circuit board, disposed inside the case; and a flexible cable, connecting the pickup head, the turntable, the transmission mechanism, and the control circuit board.

* * * * *